US007460557B2

(12) United States Patent
Ohata

(10) Patent No.: US 7,460,557 B2
(45) Date of Patent: Dec. 2, 2008

(54) MEDIA CONVERTER

(75) Inventor: Tadahiro Ohata, Kanagawa (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 10/891,869

(22) Filed: Jul. 15, 2004

(65) Prior Publication Data

US 2005/0047436 A1   Mar. 3, 2005

(30) Foreign Application Priority Data

Jul. 18, 2003   (JP)   ............................. 2003-276735

(51) Int. Cl.
*H04J 3/22*   (2006.01)
*H04N 7/01*   (2006.01)
*H04N 7/16*   (2006.01)

(52) U.S. Cl. ...................... 370/466; 370/532; 348/441; 725/135

(58) Field of Classification Search . 370/395.5–395.52, 370/395.64, 465–466, 484–486; 348/14.1, 348/441, 443; 725/105, 135, 143
See application file for complete search history.

(56) References Cited

U.S. PATENT DOCUMENTS

| 5,138,440 | A | * | 8/1992 | Radice ........................ 348/472 |
| 5,506,903 | A | * | 4/1996 | Yamashita ................... 380/216 |
| 6,014,381 | A | * | 1/2000 | Troxel et al. ............ 370/395.52 |
| 6,529,233 | B1 |   | 3/2003 | Allen |
| 6,738,372 | B1 | * | 5/2004 | Morioka et al. ............. 370/352 |
| 2001/0009446 | A1 | * | 7/2001 | Tarr et al. .................... 348/575 |
| 2002/0104098 | A1 |   | 8/2002 | Zustak et al. |
| 2003/0106066 | A1 |   | 6/2003 | Sakai |
| 2003/0226149 | A1 | * | 12/2003 | Chun et al. .................... 725/78 |
| 2006/0210065 | A1 | * | 9/2006 | Ito et al. ........................ 380/28 |

FOREIGN PATENT DOCUMENTS

| JP | 6 284244 | 10/1994 |
| JP | 2000 307625 | 11/2000 |

OTHER PUBLICATIONS

DV-Bridge Installation and Operation Guide by Miranda Technologies Inc. (Oct. 2001).*

* cited by examiner

*Primary Examiner*—Chi H. Pham
*Assistant Examiner*—Tri H. Phan
(74) *Attorney, Agent, or Firm*—Frommer Lawrence & Haug LLP; William S. Frommer; Thomas F. Presson

(57) ABSTRACT

A media converter capable of converting digital data of a unidirectional interface to digital data of a bidirectional interface or converting vice versa and converting digital data in commercial use to digital data for consumers or converting vice versa so that consumers are able to obtain even high quality images is provided. The media converter has a function for inputting digital data of a unidirectional interface and converting the inputting digital data to digital data of a bidirectional interface, and a function for inputting digital data of a bidirectional interface and converting the inputting digital data to digital data of a unidirectional interface, wherein the unidirectional interface is an HD-SDI (High Definition Serial Data Interface) format digital interface, and the bidirectional interface is a digital interface conforming to IEEE1394.

3 Claims, 2 Drawing Sheets

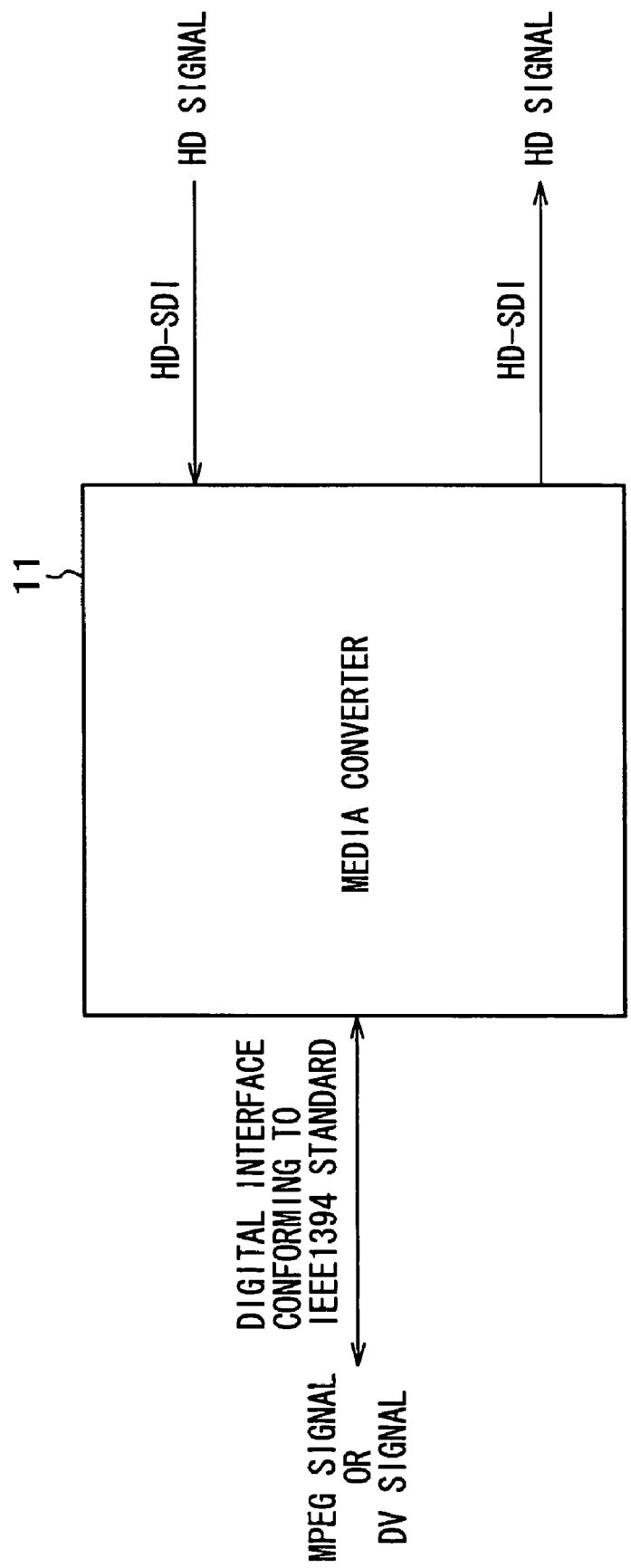

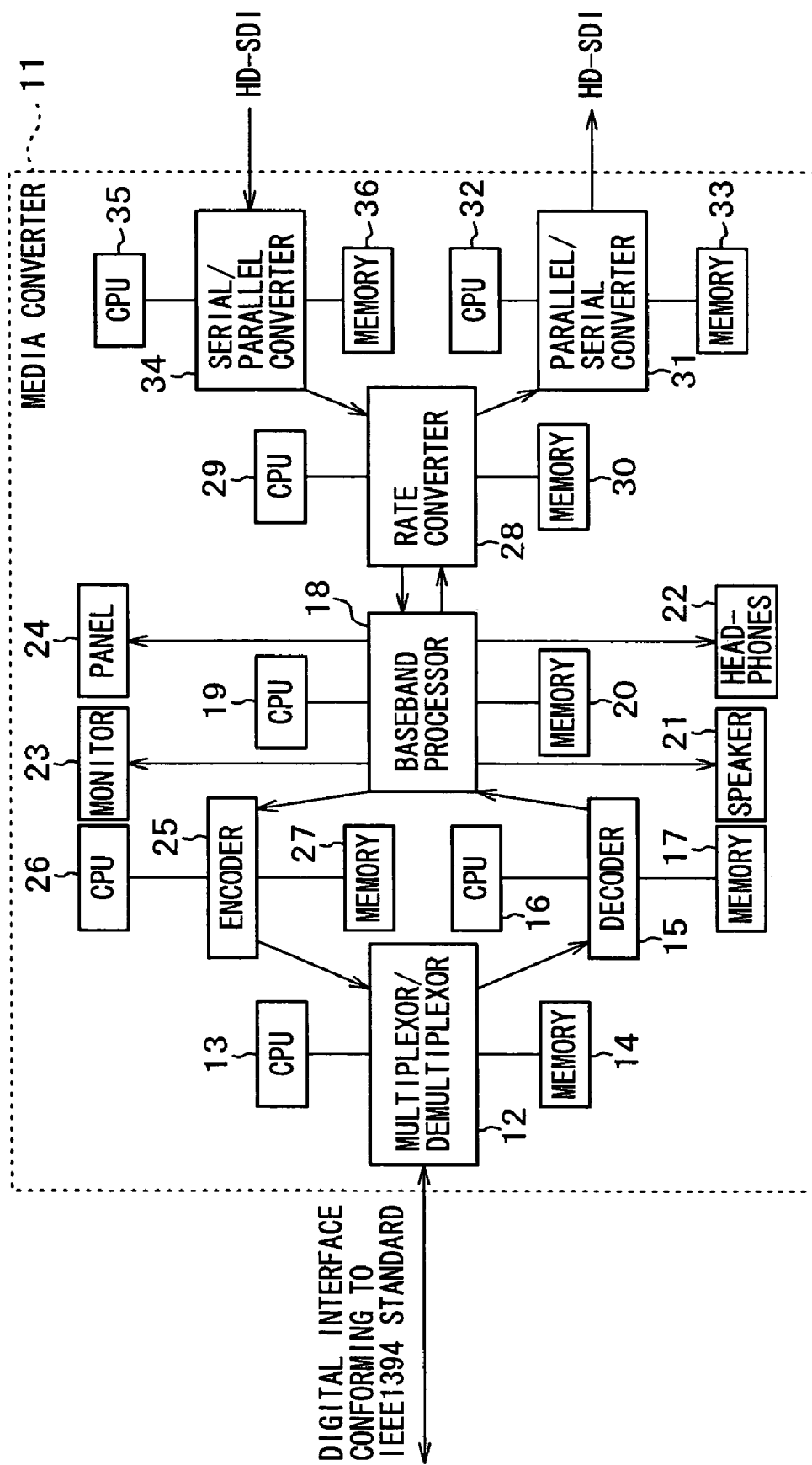

MEDIA CONVERTER

CROSS REFERENCE TO RELATED APPLICATION

The present document is based on Japanese Priority Document JP2003-276735, filed in the Japanese Patent Office on Jul. 18, 2003, the entire contents of which being incorporated herein by reference.

BACKGROUND OF THE INVENTION

1. Field of the Invention

The present invention relates to a media converter, and particularly relates to a media converter capable of interchangeable data conversion between a bidirectional interface and a unidirectional interface, and capable of interchangeable data conversion between consumer equipment and commercial equipment.

2. Description of Related Art

In the related art, interfaces used for images and audio at broadcasting stations are typically of serial communication regardless of standard broadcasting or high image-quality broadcasting. This serial communication is only unidirectional, not bidirectional as with telephone lines. As a result, at least two communication lines are necessary when data for images and audio is exchanged between commercial equipments. Further, HD-SDI (High-Definition Serial Digital Interfaces) is used as communication lines for commercial equipment within a broadcasting station in case of high image-quality broadcasts, which is so-called high-vision broadcasts. This interface is high-speed, for example approximately 1.5 GHz, so electrical power required in communication is high, and communication lines are quite expensive. In addition to this, commercial equipment for use in broadcast stations is incomparably larger than domestic equipment.

On the other hand, there are many kinds of image and audio interfaces used in typical domestic equipment, such as optical cables, component cables, and composite cables etc. Among them, bidirectional interfaces such as digital interfaces (Brand name; i.Link) and USBs etc. conforming to the IEEE1394 standard are recently used for connecting with personal computers built-in television tuners. Further, bidirectional interfaces such as LAN cables and GigaEther etc. are widely used also in internet environments becoming broadly accustomed, including in case of conventional telephone lines. As described above, while between commercial equipment and domestic equipment, differences exist in the levels of images and audio handled respectively, from the point of view of interfaces, an essential difference is that one is bidirectional and the other is unidirectional communication. This is mainly caused by communication speeds within interfaces due to differences in level of handled image quality.

[Patent Document 1]
Japanese Patent Application Publication No. Hei. 9-93552 (page 5, FIG. 1).

SUMMARY OF THE INVENTION

However, in the HD-SDI with respect to communication lines used in commercial equipment as described in the related art and digital interfaces conforming to the IEEE1394 standard and USBs etc for bidirectional interfaces used in domestic equipment, digital interfaces conforming to the IEEE1394 standard and USBs used in particular in interfaces for domestic equipment are capable of exchanging data at 400 MHz or more. However, when this is compared with HD-SDI used in commercial equipment of approximately 1.5 GHz, there is a difference in transmission speed in the order of approximately four times, and it is difficult to have interchangeable conversion of data between commercial equipment and domestic equipment. There is therefore the task of enabling interchangeable data conversion between commercial equipment and domestic equipment of different transmission speeds.

In order to address the aforementioned task, the media converter of the present invention is given the configuration shown in the following.

(1) A media converter is equipped with a function for inputting digital data of a unidirectional interface and converting the digital data to digital data of a bidirectional interface, and a function for inputting digital data of a bidirectional interface and converting the digital data to digital data of a unidirectional interface.

(2) The media converter as disclosed in (1), wherein the unidirectional interface is an HD-SDI (High Definition Serial Data Interface) format digital interface, and the bidirectional interface is a digital interface conforming to IEEE1394.

In the present invention, it is possible to convert digital data of a unidirectional interface to digital data of a bidirectional interface or convert digital data of a bidirectional interface to digital data of a unidirectional interface. This means that images and audio data used, for example, commercial equipment can be adopted by domestic equipment. The versatility of high quality images at broadcast station level and the versatility of multi-channel audio used by broadcast stations can therefore be increased.

BRIEF DESCRIPTION OF THE DRAWINGS

FIG. 1 is an outlined block diagram showing a media converter of the present invention; and FIG. 2 is a block diagram showing a media converter of the same.

DESCRIPTION OF THE EMBODIMENTS

Next, a description is given of embodiments of a media converter of the present invention with reference to the drawings.

Embodiment 1

Firstly, a media converter of the present invention is shown in FIG. 1 as an overall block view. In this embodiment, a digital interface conforming to the IEEE1394 standard is adopted as a bidirectional interface, and a HD-SDI is adopted as a unidirectional interface. In addition, bidirectional interfaces may correspond to USB or GigaEtherNet etc., and unidirectional interfaces may correspond to SD-SDI (Standard Definition Serial Digital Interface) or HD-SDTI (High Definition Serial Data Transport Interface) etc. handling compressed digital signals.

The types of data flowing through the bidirectional interface handled by this embodiment are MPEG and DV. On the one hand, data flowing at the unidirectional interface is uncompressed HD digital data.

As is clear from FIG. 1, the media converter developed on this occasion is a converter for a data stream of a digital interface conforming to the IEEE1394 standard and a HD-SDI data stream. A description of conversion details gives the following.

(1) HD signals are received via the HD-SDI, and MPEG signals are transmitted via the digital interface conforming to the IEEE1394 standard.

(2) HD signals are received via the HD-SDI, and DV signals are transmitted via the digital interface conforming to the IEEE1394 standard.

(3) MPEG signals are received via the digital interface conforming to the IEEE1394 standard, and HD signals are transmitted via the HD-SDI.

(4) DV signals are received via the digital interface conforming to the IEEE1394 standard, and HD signals are transmitted via the HD-SDI.

Next, a detailed block diagram of the media converter is shown in FIG. 2. The names of the functions of each block in the drawing are described in order.

The media converter is substantially configured by a multiplexer/demultiplexer (MUX/DEMUX) 12 connecting to a digital interface conforming to the IEEE1394 standard for domestic equipment equipped with a bidirectional interface function, a CPU 13 for controlling the multiplexer/demultiplexer 12, a memory 14 for storing information from the digital interface conforming to the IEEE1394 standard connected to the multiplexer/demultiplexer 12, a decoder 15 for decoding data from the multiplexer/demultiplexer 12, a CPU 16 for controlling the decoder 15, a memory 17 for storing data at the decoder 15, a baseband processor 18 for processing signals decoded by the decoder 15, a CPU 19 for controlling the baseband processor 18, a memory 20 for storing signals processed by the baseband processor 18, a speaker 21 for outputting signals controlled by the baseband processor 18, headphones 22 for outputting signals controlled by the baseband processor 18, a monitor 23, controlled by the baseband processor 18, for performing displaying, a panel 24 for controlling the baseband processor 18, an encoder 25 for encoding data processed by the base band processor 18 for transmission to the multiplexer/demultiplexer 12, a CPU 26 for controlling the encoder 25, a memory 27 for storing data processed by the encoder 25, a rate converter 28, a CPU 29, a memory 30, a parallel/serial converter 31 for sending signals of the rate converter 28 to the HD-SDI being as the commercial equipment, a CPU 32 for controlling the serial/parallel converter 31, a memory 33 for storing data processed by the parallel/serial converter 31, a serial/parallel converter 34 for receiving serial data via the HD-SDI of the commercial equipment, converting the serial data to parallel data, and sending the parallel data to the rate converter 28, a CPU 35 for controlling the serial/parallel converter 34, and a memory 36 for storing data processed by the serial/parallel converter 34.

The following is a description of the operation of the media converter configured as above.

First, HD signals transmitted via the HD-SDI are converted from serial data to parallel data by the serial/parallel converter 34. The number of bits of parallel data at this time depends on the system configuration. In the media converter 11 of the present invention, the number of the bits of parallel data is 8-bit, but the number of bits is by no means limited to this number, for example, it may be 10-bit, 16-bit, or 20-bit. Further, the CPU 35 and memory 36 attached to the block of the serial/parallel converter 34 are installed at the media converter 11 developed to convert serial digital data to parallel digital data but in cases of causing an external clock to operate, they are by no means limited to being required. HD signals converted to parallel digital data are down-converted by the rate converter 28. The down-convert frequency in this function depends on the system configuration similar to the case of the serial/parallel converter 34, and maybe any frequency as far as lower than the frequency of HD-SDI. The CPU 29 and the memory 30 attached to this block are by no means limited to being necessary as in the case of the serial/parallel converter 34.

Down-converted HD signals are then subjected to sound and image qualification and editing, to signal conversion for display at the panel 24 and monitor 23, and to signal conversion for outputting to the headphones 22 and speaker 21. In brief, various signals processing that cannot be performed in any signal format other than baseband is carried out. Further, the CPU 19 and memory 20 attached to this block are necessary in order to carry out various signal processing and when signal processing is not carried out, they are by no means limited to be necessary.

The HD signals subjected to baseband signal processing are encoded into MPEG and DV signals so as to befit a digital interface stream conforming to the IEEE1394 standard by the encoder 25, multiplexed by the multiplexer/demultiplexer 12, and transmitted via a digital interface conforming to the IEEE1394 standard. To reiterate, the CPU 26 and the memory 27 attached to this block are by no means limited to be necessary as in the case of the serial/parallel converter 34.

Next, a description is given of converting MPEG signals and DV signals via the digital interface conforming to the IEEE1394 standard to HD signals.

First, the decoded MPEG and DV signals are subjected to the same processing as described above by the baseband processor 18 and are upconverted by the rate converter 28. The frequency of upconverting in this function depends on the system configuration, so it may be any frequency as far as higher than the frequency of the baseband signal processing.

The up-converted MPEG and DV signals are converted from parallel digital data to serial digital data by the parallel/serial converter 31 and transmitted via an SDI. The CPU 32 and the memory 33 attached to this block are by no means limited to be necessary as in the case of the serial/parallel converter 34.

In the above system configuration, interchangeable data conversion is carried out between a bidirectional interface and a unidirectional interface. Further, controls of equipments connected to each interface are easily carried out by interchangeably converting at the baseband processor to own commands of each equipment.

To give a good example of usage, in a digital interface conforming to the IEEE1394 standard, control commands can be sent at the same time in the direction opposite to the direction of current stream of images and audio but when this function is utilized, control of equipment connected to the HD-SDI is possible while receiving images. Therefore with respect to equipment adopting HD-SDI that only possesses a unidirectional interface, operating time is reduced and operating efficiency is improved. Digital interfaces conforming to the IEEE1394 standard are bidirectional interfaces, so controlling of connected equipment during the time of transmitting images is inevitably also possible. To give an example, while monitoring, by a commercial monitor, images and sound of equipment transmitted via the media converter 11, zooming in and out and increasing and decreasing volume etc. can be carried out as necessary.

What is claimed is:
1. A media converter comprising:
  a first function for inputting digital data of a unidirectional interface with a high transmission speed of at least 1.5 GHz and converting said digital data to digital data of a bidirectional interface;
  a second function for inputting digital data of a bidirectional interface and converting said digital data to digital data of a unidirectional interface with a high transmission speed of at least 1.5 GHz; and a third function for down-converting frequency when the first function is selected and up-converting frequency when the second function is selected, wherein said unidirectional interface is an HD-SDI (High Definition Serial Data Interface) format digital interface, and said bidirectional interface is a digital interface conforming to IEEE1394.

2. A media converter comprising:

a baseband processor for performing a predetermined baseband signal process with down-converted digital data of a unidirectional interface with a high transmission speed of at least 1.5 GHz or decoded digital data of a bidirectional interface;

a rate converter for down-converting digital data of said unidirectional interface with a high transmission speed of at least 1.5 GHz or up-converting digital data of said bidirectional interface, on which said predetermined baseband signal process is performed by said baseband processor; and a serial/parallel converter for converting digital data of said unidirectional interface, from aerial digital data to parallel digital data, wherein said media converter converts inputted digital data of said unidirectional interface to digital data of said bidirectional interface or inputted digital data of said bidirectional interface to digital data of said unidirectional interface, and wherein said digital data converted to said parallel digital data is down-converted by said rate converter.

3. A media converter comprising:

a baseband processor for performing a predetermined baseband signal process with down-converted digital data of a unidirectional interface with a high transmission speed of at least 1.5 GHz or decoded digital data of a bidirectional interface;

a rate converter for down-converting digital data of said unidirectional interface with a high transmission speed of at least 1.5 GHz or up-converting digital data of said bidirectional interface, on which said predetermined baseband signal process is performed by said baseband processor; and a parallel/serial converter for converting said digital data of said bidirectional interface up-converted by said rate converter, from parallel digital data to serial digital data, wherein said media converter converts inputted digital data of said unidirectional interface to digital data of said bidirectional interface or inputted digital data of said bidirectional interface to digital data of said unidirectional interface.

* * * * *